US009212708B2

(12) United States Patent
Spahr et al.

(10) Patent No.: US 9,212,708 B2
(45) Date of Patent: *Dec. 15, 2015

(54) HUB FOR AT LEAST PARTIALLY MUSCLE-POWERED VEHICLES

(71) Applicant: DT SWISS INC., Grand Junction, CO (US)

(72) Inventors: Stefan Spahr, Lengnau (CH); Martin Walthert, Aarberg (CH)

(73) Assignee: DT Swiss Inc., Grand Junction, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,746

(22) Filed: Aug. 26, 2013

(65) Prior Publication Data

US 2014/0060992 A1 Mar. 6, 2014

(30) Foreign Application Priority Data

Aug. 28, 2012 (DE) .......................... 10 2012 016 949

(51) Int. Cl.
*F16D 41/24* (2006.01)
*B60B 27/04* (2006.01)
*F16D 27/01* (2006.01)
*F16D 41/26* (2006.01)
*F16D 41/36* (2006.01)
*B60B 27/00* (2006.01)
*B60B 27/02* (2006.01)

(52) U.S. Cl.
CPC ............ *F16D 41/24* (2013.01); *B60B 27/0047* (2013.01); *B60B 27/023* (2013.01); *B60B 27/047* (2013.01); *F16D 27/01* (2013.01); *F16D 41/26* (2013.01); *F16D 41/36* (2013.01)

(58) Field of Classification Search
CPC ....... B60B 27/047; F16D 41/24; F16D 41/36; F16D 27/01
USPC ......................... 192/64, 69.81, 84.3
See application file for complete search history.

(56) References Cited

U.S. PATENT DOCUMENTS

| 6,588,564 | B1* | 7/2003 | Jager et al. | 192/64 |
| 2009/0255774 | A1* | 10/2009 | Hsu | 192/64 |
| 2012/0048671 | A1* | 3/2012 | Kozak et al. | 192/64 |
| 2012/0285785 | A1* | 11/2012 | Tho | 192/64 |
| 2013/0105266 | A1* | 5/2013 | Spahr et al. | 192/46 |
| 2013/0126292 | A1* | 5/2013 | Lin | 192/64 |
| 2014/0062164 | A1* | 3/2014 | Spahr et al. | 301/6.9 |

FOREIGN PATENT DOCUMENTS

| DE | 202011108822 U1 | 2/2012 |
| EP | 2422996 A1 | 2/2012 |

* cited by examiner

*Primary Examiner* — Richard Lorence
(74) *Attorney, Agent, or Firm* — Greer, Burns & Crain, Ltd.

(57) ABSTRACT

A hub for at least partially muscle-powered vehicles having a hub axle, a hub body, a rotatable driving device, and a freewheel device. The freewheel device includes a first and a second engagement component cooperating with one another having at least one axial toothing each. The freewheel device is biased to the engaging position via a magnetic biasing device. A first magnetic device biases the first engagement component and a second magnetic device biases the second engagement component to the engaging position. At least one magnetic component comprises a carrier unit and a multitude of magnetic units disposed thereat.

13 Claims, 4 Drawing Sheets

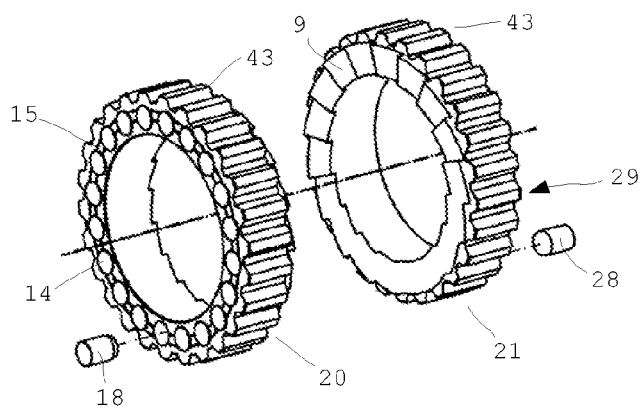
Fig. 5
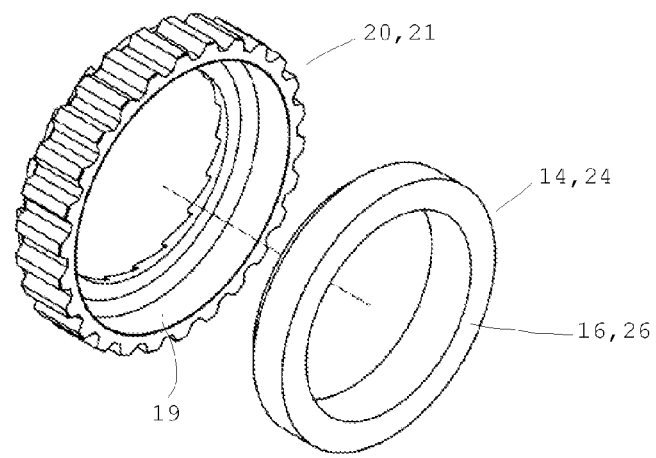
Fig. 6
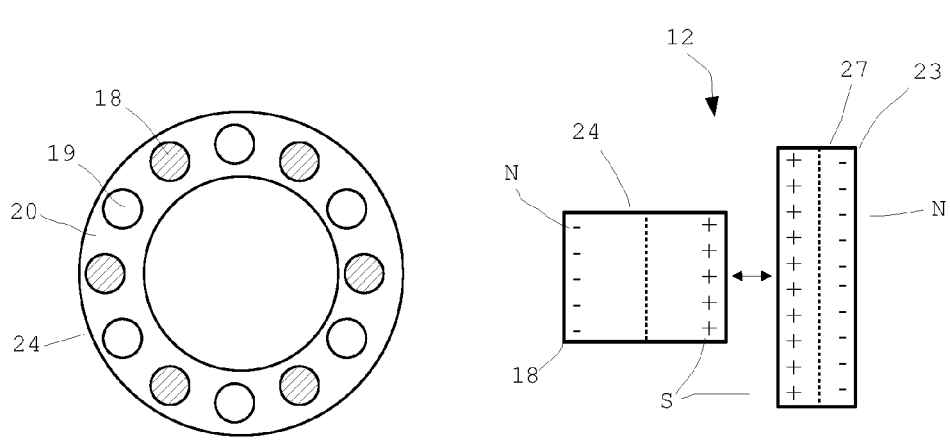
Fig. 7
Fig. 8

HUB FOR AT LEAST PARTIALLY MUSCLE-POWERED VEHICLES

BACKGROUND

The present invention relates to a hub for at least partially muscle-powered vehicles and in particular for two-wheeled vehicles. Such a hub comprises a fixed hub axle, a hub body rotatable relative thereto, a rotatable driving device, and a toothed disk freewheel. The driving device may for example be configured as a rotor to which at least one sprocket or else a set of sprockets can be mounted for transmitting the driving torque via the driving device to the hub body. Optionally the driving device may be configured integrally with a sprocket or a set of sprockets.

In DE 20 2011 108 822 U1, a hub construction has been disclosed wherein, instead of axial toothings, an annular driving component and a passive component are provided. At the annular driving component a conical first ratchet is formed which is provided with a pair of triangular contact areas forming a conical surface in the radial direction. The passive component is formed provided with a conical second ratchet. The cone-type shape of the ratchets is intended to reduce friction in axial displacement. For biasing the passive component and the driving component to engagement with one another, two pairs of annular magnets may be provided with the magnetic rings of a pair repelling one another, thus urging the passive component and the driving component toward one another. In the alternative, coil springs may be provided for urging the driving component and the passive component toward one another. The drawback of the hub is that the hub construction with the magnetic rings is comparatively heavy. Using coil springs allows a lower weight. While the conical ratchets allow to optionally reduce the friction in axial displacement, this also reduces the area of engagement as the driving component and the passive component move just a little away from one another. This may impede, or turn insufficient, the responsivity in relation to the force relationships. However, with the biasing force increased, the friction in the freewheeling state will increase in turn. This design does allow a reduction in friction at the outer diameter. However, precise guidance is required, thus increasing friction at the inner diameter to allow an operationally reliable solution.

EP 2 422 996 A1 discloses a rear wheel hub for a bicycle in which a freewheel is provided between the rotor and the hub shell. The freewheel comprises an axial toothing at the rotor and a toothed disk that is axially movably and non-rotatably received in the hub shell, with an axial toothing that is biased by two annular permanent magnets to the engaging position with the axial toothing at the rotor. According to EP 2 422 996 A1, the maintenance-free construction of this design is an advantage. The magnetic biasing device applies a reproducible force on the movable toothed disk at all times, independently of mechanical properties. EP 2 422 996 A1 shows the basic drawback, however, that the strength of the magnetic field and thus the strength on the movable toothed disk decreases with the distance between the two permanent magnets. In the freewheel position, the two permanent magnets are disposed particularly closely to one another such that a relatively high force urges the toothed disk to the engaging position. Although this results in fast responsivity, there is the drawback of increased friction in the freewheeling state. Moreover, the gliding of the axial toothings on one another in the freewheeling state emits loud noises. In the engaged state, the acting biasing force is considerably lower though since the distance between the two permanent magnets is considerably larger. This may be disadvantageous to the reactivity of the freewheel in or close to the engaged state in particular when the axial toothing of the toothed disk is only just not yet engaged with the axial toothing at the rotor.

SUMMARY

It is therefore the object of the present invention to provide a hub for at least partially muscle-powered vehicles such as two-wheeled vehicles and bicycles wherein the freewheel device is provided with a magnetic biasing device and wherein the freewheel device has a low weight and optimum freewheeling properties.

A hub according to the invention is provided for at least partially muscle-powered vehicles and in particular two-wheeled vehicles or bicycles and is provided with a hub axle, a hub body, a rotatable driving device, and a freewheel device. The freewheel device comprises a first engagement component and a second engagement component cooperating with one another. The two engagement components comprise at least one axial toothing each. The freewheel device and in particular the engagement components are biased to an engaging position via a magnetic biasing device. A first magnetic device is provided which biases the first engagement component to the engaging position and a second magnetic device is provided which biases the second engagement component to the engaging position.

The hub according to the invention has many advantages. The hub according to the invention allows reliable operation. The fact that the two engagement components are biased to the engaging position and urged toward one another by at least one magnetic device each achieves more optimum mechanical and also acoustic properties. The stroke length for transferring the freewheel device from an engaging position to a freewheel position may basically be chosen as large as, or else larger than, in the prior art. Unlike the prior art, however, the stroke length to be overcome in the hub according to the invention is split between the two magnetic devices such that the difference in distances to be overcome in one magnetic device is only about half that of the prior art.

This in turn leads to considerably reduced differences in the forces of the biasing device between the engaging position and the freewheel position. This allows on the one hand to achieve a high response speed in the freewheel position, while in the engaging position a press-on force is applied that is still sufficiently high and correspondingly results in good responsivity of the hub according to the invention.

It is even possible to chose an overall acting press-on force of the biasing device in the engaging position that is higher than in the cited prior art while in the freewheel position the overall acting press-on force is lower than or equal to the press-on force of the known hub. In the prior art, the press-on force of the magnetic biasing device in the freewheel position must be chosen large enough such that even in or closely to the engaging position the acting press-on force or biasing force is still sufficiently high. In the present invention, the biasing forces in the engaging position and the freewheel position can be better coordinated so as to have more suitable or else better conditions in all the cases and positions of the engagement components.

Although a magnetic biasing device is used for biasing the freewheel device to the engaging position, favorable and better adaptable properties may be set both in the freewheel position and in the engaging position.

It is also possible and preferred for at least one engagement component to be at least partially magnetic per se such that at least part of the engagement component is formed by the first or second magnetic device. Then only one separate magnetic device for at least one engagement component is required.

A considerable advantage of magnetic biasing devices is that of less wear. The moving mass may likewise be reduced so as to improve dynamics.

In a preferred specific embodiment of the invention at least one magnetic device comprises a pair of mutually repelling magnetic components. It is also possible and preferred for both the first magnetic device and the second magnetic device to comprise a pair of mutually repelling magnetic components each. These magnetic devices enhance simplicity of structure and reliability of function. Since, in operation the distance between the mutually repelling magnetic components of a magnetic device preferably only changes by half the total stroke length, the mutually repelling magnetic forces remain better comparable than in the case that the distance between pairs of mutually repelling magnetic components would double once again. The mutually repelling magnetic forces decrease non-linearly with their distance from one another. The precise curve depends on the geometry and the materials used also of the other parts. In some cases, the curve may depend on a function in which the distance shows an approximately square effect on the functional result. Given such a function, four times the basic force must be provided as the distance doubles. Therefore, the effective length remains more constant if the stroke length to be overcome is not very large. The difference between an axial force in freewheeling operation to an axial force or basic force in the engaged state is lower—this allows a lower force and thus less friction and better and more reliable engagement in the engaged state.

Preferably, a magnetic component comprises a magnetic ring or the like. Such a magnetic ring consists at least in part of, or at least comprises, a permanent magnet. A circumferential magnetic ring offers the advantage that independently of the angular position of the engagement components of the freewheel device to one another the magnetic field of the magnetic ring is effective at every angular position.

Preferably, a magnetic component comprises a magnetic ring and another magnetic component comprises single permanent magnets or the like disposed on or distributed over the circumference. In this type of an asymmetric solution, the acting force may be independent of the angular position since the opposite magnetic ring generates a magnetic field that is constant over the angle at circumference.

This enables a reduced weight once again, since the quantity of single permanent magnets provided or disposed is only as required. The quantity may be oriented at the purpose and may even be exchanged in operation.

A magnetic component comprising a magnetic ring or a shared magnetic ring arrangement and the other of the magnetic components comprising multiple single magnetic units or permanent magnets, allows particular flexibility in adjusting the acting force and saving weight. Moreover, due to the magnetic ring the acting force always remains the same, independently of the relative angular position to one another.

A magnetic unit may be configured as a permanent magnet which is e.g. cylindrical in shape. The shape of an angular segment or a cubic shape is possible as well. Preferably a magnetic unit or a permanent magnet is much smaller and much lighter in weight than is a magnetic ring. Preferably, the weight of a magnetic unit is less than $\frac{1}{5}$ or $\frac{1}{10}$ of the weight of a magnetic ring.

The use of multiple joined magnetic rings as one of the magnetic components enables the magnetic rings to be arranged together as one total magnetic ring device on the whole.

Preferably at least one magnetic component comprises at least one magnetic unit disposed thereat. It is possible for at least one magnetic unit to be directly received at or in at least one engagement component. For example, at least one magnetic unit can be inserted into a bore or aperture in the engagement component.

In advantageous specific embodiments at least one magnetic component comprises at least one carrier unit and at least one magnetic unit received thereat. It is preferred that a plurality of magnetic units can be disposed and/or received at a carrier unit. Particularly preferably two or more magnetic units are inserted into one carrier unit. Each single magnetic unit may consist of one or more single magnet(s). The axial toothing or at least one axial toothing may be provided or configured at the associated carrier unit. Then, the toothed disk is preferably formed by the carrier unit at which a multitude of magnetic units can be received. Preferably, the toothed disk is formed integrally with the carrier unit.

In preferred specific embodiments, the carrier unit comprises a plurality of accommodations which can receive a multitude of magnetic units. The plurality of accommodations may correspond to the multitude of magnetic units. Then, one magnetic unit is received in each accommodation. Or else, it is possible for the number of accommodations to be larger than the number of magnetic units. Then, it is for example possible for one magnetic unit to be disposed at every second or third accommodation, while the one or the two accommodation(s) in between is (are) not loaded with a magnetic unit.

Particularly preferably, the number of magnetic units is variable for example for adapting the effective force. This configuration allows particular flexibility in adjusting the effective magnetic field and thus the effective biasing force. In relation to the desired field strength and in relation to the desired contact pressure a corresponding number of magnetic units may be positioned in the respective accommodations. Such adjusting of the effective biasing force may even be done during a break during a tour or in the training camp wherein for example the desired number of magnetic units are taken out of or inserted into the accommodations. The hub can in particular be dismantled without any tools and preferably by hand.

A different number of magnetic units and/or magnetic devices having magnetic units of different strengths also offers the advantage that different conditions can be set or predetermined depending on the range of application. Thus, in the case of a mountain bike a large number of teeth on a toothed disk tends to be provided as the engagement component for quick engagement. Then, a comparatively strong magnetic field may be preferred, optionally with many and/or strong magnetic units. In the case of a racing bicycle, however, toothed disks tend to be used as the engagement components having a small number of teeth (e.g. 36 instead of 72, thus half the number) which cause less friction in the freewheeling state. Now, a smaller number and/or weaker magnetic units may be employed. This specific embodiment of the invention allows realization of magnetic fields of varying strengths using reasonable efforts.

Particularly preferably the, or at least one carrier unit is disposed axially adjacent to at least one axial toothing. In particular are the magnetic units or is the magnetic ring provided as closely as possible to the axial toothing to ensure efficient force transmission. It is preferred for the carrier unit or at least one carrier unit to consist of a lightweight material such as a light metal, plastic, or even a lightweight plastic, a composite, or a natural material. This may allow to considerably reduce the weight of the hub without compromising the function. When the axial toothing is provided at the carrier unit, then the carrier unit preferably consists of steel or a similarly strong material.

A carrier unit may for example be configured as, or comprise, a carrier cage. A configuration as a magnetic cage is likewise possible at which one, two or more magnetic units can be disposed and/or received and/or fastened.

Advantageously substantially all the magnetic units of a magnetic component show a same orientation of the magnetic poles. This means in particular that the magnetic units of a magnetic component are preferably aligned in parallel to one another at least in part such that the north poles of the magnetic units are disposed adjacent to one another, as are the south poles of the magnetic units.

In all the configurations, preferably at least one engagement component is configured as a toothed disk or comprises such a toothed disk. Then at least one magnetic component is preferably disposed at the toothed disk. The toothed disk comprises an axial toothing meshing with the other axial toothing in the engaging position.

In advantageous configurations the toothed disk shows a circumferential cross section which is substantially L-shaped. This configuration allows an overall lightweight hub. Moreover, there is the advantage that a magnetic component can be disposed within the toothed disk so as to save mounting space. It is also possible to provide a U-shaped cross-section with a U that is opened radially inwardly or opened axially outwardly which is oriented in the direction axially opposite to the axial or end toothing.

In all the specific embodiments and configurations, preferably two toothed disks are provided as the engagement components. These two toothed disks are received in the hub in particular floating. Preferably each toothed disk is received non-rotatably and axially displaceably. One of these toothed disks is disposed non-rotatably and axially displaceably in the hub body, while the other of the toothed disks is provided non-rotatably and axially displaceably in or at the driving device. A floating mounting of the two toothed disks allows particular flexibility in adapting the position of the toothed disk to a currently prevailing situation. In this way, each of the toothed disks can angularly align. Two floatingly received toothed disks contribute to enhancing operational safety and increase reliability.

At least one toothed disk may be received in a retaining ring which is for example non-rotatably disposed at the hub body. It is also possible for a retaining ring with adapted dimensions to serve for receiving a toothed disk with the retaining ring provided at the driving device. A retaining ring may be externally threaded for screwing the retaining ring into the hub body or the driving device. Then, the retaining ring is configured as a threaded ring. The retaining ring comprises an inner contour adapted to an outer contour of the toothed disk to non-rotatably and axially displaceably receive a toothed disk.

Preferably at least one magnetic unit is disposed at least in part in an accommodation of the toothed disk. The toothed disk may comprise recesses, apertures, or bores therefor.

The magnetic components of a magnetic device are preferably disposed relative to one another such that the north poles or else the south poles of adjacent magnetic components of a magnetic device show the same poles at their sides facing one another. In this way, the magnetic device acts as a biasing unit which urges the two magnetic component away from one another. Since both of the magnetic devices contribute to the required stroke length, each of the magnetic devices is only required to provide half of the total stroke length required.

It is possible and preferred to provide at least one spacer sleeve. At least one spacer sleeve may also serve to receive and position a magnetic component.

Preferably, at least one magnetic isolator is provided. It is also preferred to employ magnetic conductors to specifically shape the acting magnetic field. These magnetic isolators and/or conductors can be very advantageous for effectively shaping the magnetic field.

In all the configurations, it is preferred for the teeth of the axial toothings to show a tooth shape having an in particular negative tooth flank such that the toothed disks automatically contract at least in part as engagement begins.

Preferably, it is possible for at least one engagement component to be configured as a magnetic device or for at least one magnetic device to be configured as an engagement component.

BRIEF DESCRIPTION OF THE DRAWINGS

Further advantages and features of the present invention can be taken from the description of the exemplary embodiments which will be discussed below with reference to the enclosed figures.

The drawings show in:

FIG. 5 an enlarged illustration of the toothed disks of the freewheel device in a first embodiment;

FIG. 6 a toothed disk of another embodiment;

FIG. 7 a schematic side view of a carrier unit; and

FIG. 8 a simplistic illustration of the poles of a magnetic device.

DETAILED DESCRIPTION

Figure 1:
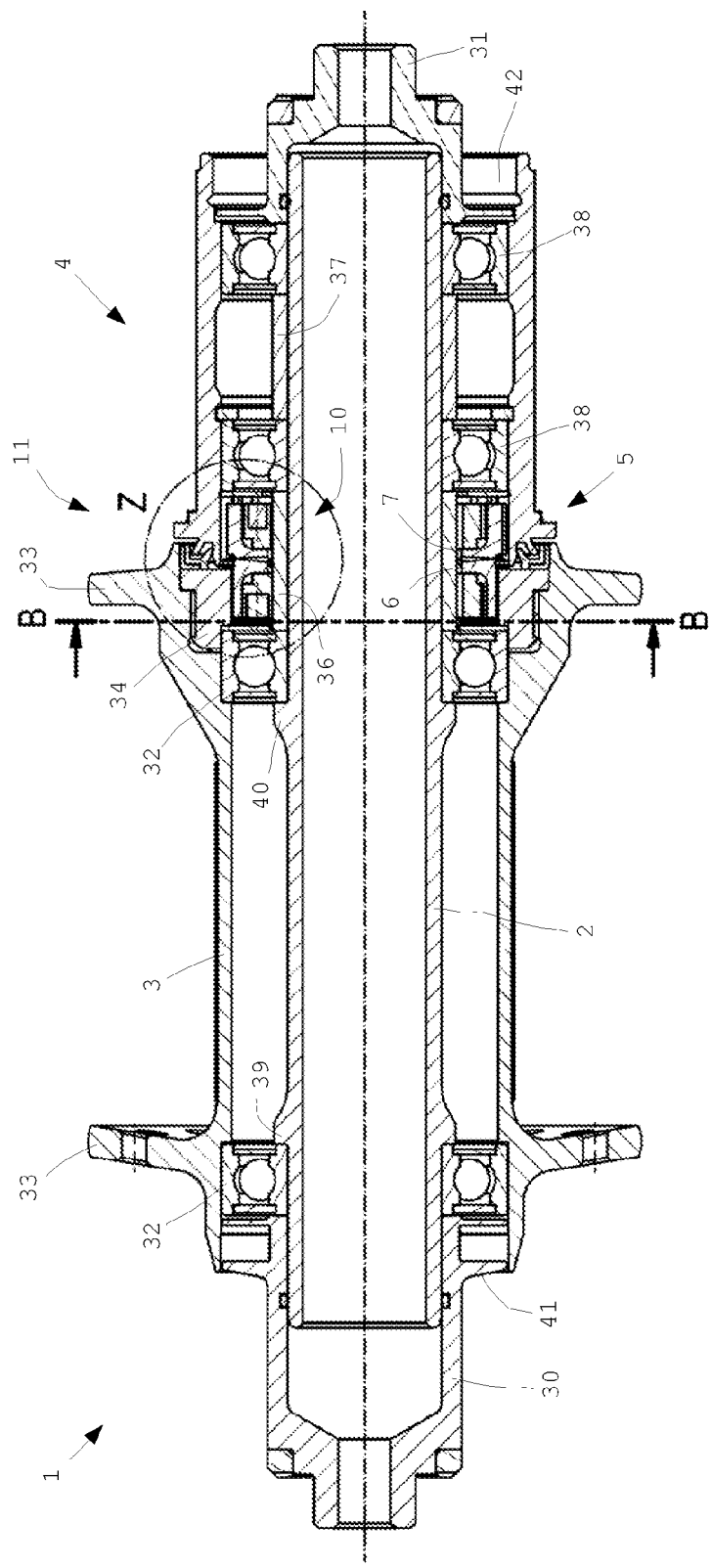
FIG. 1 a schematic cross-section of a hub according to the invention.

FIG. 1 shows a hub 1 configured as a rear wheel hub and suitable to be used in at least partially muscle-powered vehicles and in particular two-wheeled vehicles such as bicycles.

The hub is provided with a fixed axle 2. The hub body 3 is received rotatable relative to the fixed axle 2 via bearings 32. Spoke flanges 33 are provided at the hub body 3 for fastening spokes.

The driving device 4 is presently configured as a rotor. A sprocket or else a set of sprockets may be disposed at the driving device for transmitting the driving force to the hub. Or else the driving device 4 might be configured integrally with a sprocket or a set of sprockets. Bearings 38 are provided for supporting the driving device 4 relative to the fixed axle 2.

Between the driving device 4 and the hub body 3 a freewheel device 5 is provided which allows relative motion of the hub shell to the driving device 4.

The freewheel device 5 presently comprises a first engagement component 6 and a second engagement component 7. The two engagement components 6 and 7 are configured as toothed disks 20 and 21. The engagement component 6 configured as the toothed disk 20 is received in the threaded ring 34 to be non-rotatable but axially displaceable. The hub body 3 preferably consists of a light metal and may be configured as one piece or multiple pieces. The threaded ring 34 fastened in the hub shell may also consist of a light metal such as aluminum and have a coated surface. The threaded ring 34 may also consist of a stronger material such as steel.

The or at least one toothed disk 20, 21 may consist of a magnetic material at least in part. The toothed disk may at least in part consist of NiCr21Mo or comprise this material. Another magnetic material is also possible which is e.g. hardened or hard-coated.

The freewheel device 5 with the engagement components 6 and 7 is biased to the engaging position 11 by means of a magnetic biasing device 10 as illustrated in FIG. 1.

At the ends of the fixed axle 2 adapter rings 30 and 31 are provided as end pieces. The end pieces 30 and 31 are provided with seals 41 and 42 to protect the interior of the hub 1 from dust, dirt, and moisture.

In assembling the adapter rings 30 and 31 are inserted into the dropouts for example of a bicycle. Thereafter, the hub is clamped between the dropouts by means of a quick release at the end pieces 30 and 31. The force flow extends from the adapter ring 30 via the inner bearing cup of the bearing 32 and is transmitted via the shoulder 39 at the fixed axle 2 through the axle 2 to the shoulder 40. There the force is transmitted further via the inner ring of the bearing 32 to the spacer sleeve 36. The force is transmitted from the spacer sleeve 36 via the inner ring of the bearing 38 to the spacer sleeve 37. From there, the force is transmitted via the inner ring of the bearing 38 to the adapter ring 31 and finally to the other dropout. In this way, there ensues a defined, force-fit accommodation of the hub at the dropouts of a bicycle.

Figure 2:
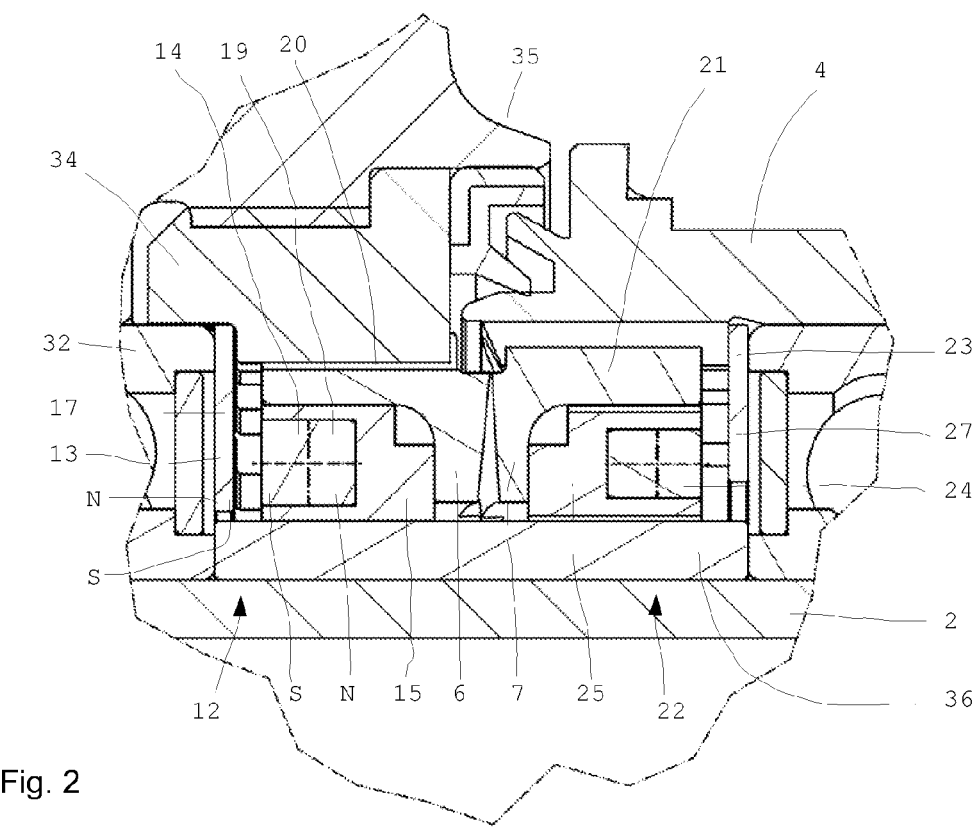
FIG. 2 an enlarged illustration of the detail Z of FIG. 1.

FIG. 2 shows an enlarged illustration of the detail Z of FIG. 1. The bearing 32 is provided on the fixed axle 2 for supporting the hub body 3. The threaded ring 34 is screwed into the hub body 3. The freewheel device 5 with the engagement components 6 and 7 is provided between the hub body 3 and the driving device 4. A sealing device 35 between the hub body 3 and the driving device 4 protects the interior of the hub 1 from dust and dirt.

The two engagement components 6 and 7 configured as toothed disks 20 and 21 presently show an approximately L-shaped structure in cross-section so as to allow to dispose further components in the interior of the toothed disks 20, 21.

The magnetic component 14 is disposed in the toothed disk 20 which presently comprises a carrier unit 15 with accommodations 19 provided therein. The magnetic component 13 is provided laterally, axially further outwardly, presently configured as a magnetic disk 17 and extending around the fixed axle and the spacer sleeve 36 disposed thereon. The spacer sleeve 36 may also serve for defined positioning of the magnetic component 13. In this way reproducible relationships are provided.

The magnetic device 22 comprises the magnetic component 23 which is presently also configured as a magnetic disk 27 and the magnetic component 24 received in the interior of the toothed disk 21. Presently, one carrier unit 15, 25 each is provided in the interior of the toothed disk 21 as well as in the interior of the toothed disk 20 comprising a plurality of apertures or bores. The toothed disks 21 and 22 may also be formed integrally with the carrier units 15, 25. The magnetic components 13 and 23 may also cause axial limitation to the stroke length of the magnetic devices 12 and 22.

Each of the magnetic devices 12, 22 only needs to provide approximately half the entire stroke length such that the distances between the magnetic components 13 and 14 respectively 23 and 24 only change by half the stroke length in operation. In this way, the acting magnetic forces may remain relatively constant which results in homogeneous responsivity.

Figure 3:
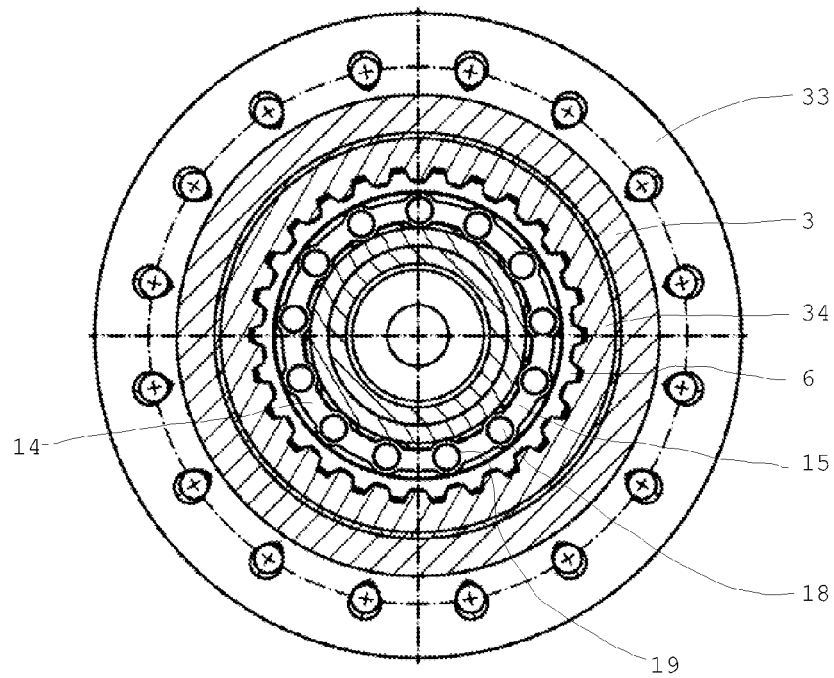
FIG. 3 section B-B of FIG. 1.

FIG. 3 shows the cross section B-B of FIG. 1. The outermost circle shows the spoke flange 33 of the hub 1. The hub body 3 into which a threaded ring 34 is screwed as a retaining ring extends radially inwardly.

The interior of the toothed disk 20 in turn is provided with, or the toothed disk 20 is configured as, a carrier unit 15. The carrier unit 15 may comprise a plurality of accommodations 19. A magnetic unit 18 may be provided in some or all of the accommodations 19. The strength of the magnetic field may be varied via the number of the magnetic units 18.

Figures 4A, 4B:
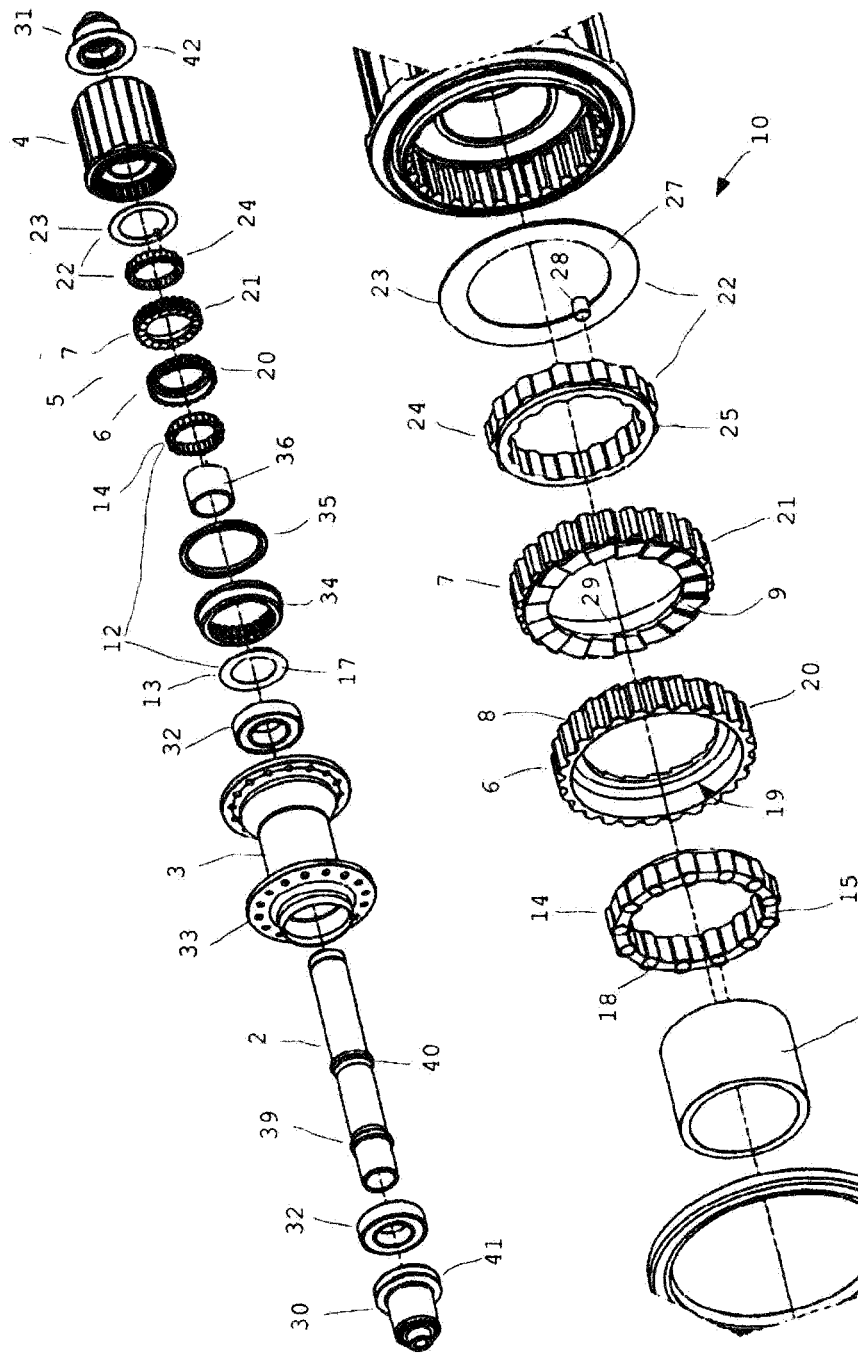
FIG. 4*a* an exploded view of the multitude of the parts of the hub according to the invention.
FIG. 4*b* an exploded view of the freewheel of the hub according to the invention.

FIG. 4a shows a schematic exploded view of the hub 1 where the entire hub is illustrated. FIG. 4b shows the enlarged portion of the freewheel. The end pieces 30 and 31 with the seals 41 and 42 can be recognized at the two ends. The bearing 32 for supporting the axle 2 follows the end piece 30. The axle 2 shows shoulders 39 and 40 for forwarding the occurring forces. The bearing 32 is illustrated to the right of the hub body 3. Thereafter, the magnetic component 13 follows which is presently configured as the magnetic disk 17. When mounted, the threaded ring 34 is screwed into the hub body 3. The seal 35 serves as a sealing between the hub body 3 and the drive unit 4. The spacer sleeve 36 secures the magnetic disk 17 in the axial direction. The magnetic component 14 together with the magnetic component 13 forms the first magnetic device 12. The second magnetic device 22 is formed by the magnetic components 23 and 24.

In assembling the carrier unit 15 with the magnetic units 18 received therein is inserted into the interior of the toothed disk 20.

FIG. 5 shows an enlarged illustration of the toothed disks 20 and 21. The toothed disk 20 in the receiving space 19 comprises a carrier unit 15 configured integrally with the toothed disk 20 or a carrier unit provided separately and pushed in, which serves to receive magnetic units 18 through a plurality of accommodations 19. In analogy the toothed disk 21 may receive a carrier unit 25 or be integrally configured being provided with accommodations 29 into which magnetic units 28 can be inserted. The toothed disks are provided with radial toothings 43 on the outer circumference.

FIG. 6 shows another configuration of toothed disks 20, 21, wherein presently no carrier unit 15 is inserted into, or provided in, the accommodation 19 but a magnetic ring 16 or 26 as the magnetic component 14 respectively 24. A fundamental advantage in using two floatingly supported toothed disks is better engagement than with one moving part or toothed disk only.

FIG. 7 shows a schematic illustration of a carrier unit 15 that is presently separate, with accommodations 19 provided thereat. In the schematic illustration according to FIG. 7, every second accommodation is provided with a magnetic unit 18 which are presently illustrated hatched. By way of adapting the number of magnetic units 18 any desired force can basically be specified and set as the biasing force of the engagement components 6 and 7 toward one another. In the same way a carrier unit 15, 25 incorporated in the toothed disk may be provided. Then it comprises the axial toothing and in particular also the external toothing.

FIG. 8 shows in a schematic illustration the magnetic device 12 with the magnetic components 23 and 24. In the presently illustrated variant, the south poles S "+" are adjacent to one another and mutually repelling. Since two magnetic devices are provided, each is only required to provide a short stroke length which considerably reduces force variations in operation and allows better and more specific setting of forces.

In all the cases, the two axial toothings 8, 9 are disposed axially movable relative to one another. The axial toothing 8 is integrally provided at the toothed disk 20 as the engagement component 7 and the axial toothing 9 is an integral component of the toothed disk 21 as the engagement component 7.

The hub 1 according to the invention allows optimal adaptation of the properties of the freewheel to the existing conditions. An optimal press-on force and also a favorable distribution of the press-on force can be achieved via an adapted number of magnetic units 18, 28 and/or magnetic components 13, 14 and/or materials. This requires little effort. Thus, the freewheel may be adapted to the type of bicycle and also to a specific bicycle. An adaptation to the route conditions is also possible in a simple way. The friction acting in the freewheeling state may be reduced so as to reduce noises and wear. On the whole the hub according to the invention provides an advantageous configuration wherein the use of two magnetic devices enables a more homogeneous distribution of forces such that the acting engaging force can be set more precisely to the desired results both in the engaging position and in the freewheel position.

| List of reference numerals: | |
|---|---|
| 1 | hub |
| 2 | hub axle |
| 3 | hub body |
| 4 | driving device |
| 5 | freewheel device |
| 6 | engagement component |
| 7 | engagement component |
| 8 | axial toothing |
| 9 | axial toothing |
| 10 | biasing device |
| 11 | engaging position |
| 12 | first magnetic device |
| 13 | magnetic component |
| 14 | magnetic component |
| 15 | carrier unit |
| 16 | magnetic ring |
| 17 | magnetic disk |
| 18 | magnetic unit |
| 19 | accommodation |
| 20 | toothed disk |
| 21 | toothed disk |
| 22 | second magnetic device |
| 23 | magnetic component |
| 24 | magnetic component |
| 25 | carrier unit |
| 26 | magnetic ring |
| 27 | magnetic disk |
| 28 | magnetic unit |
| 29 | accommodation |
| 30 | adapter ring |
| 31 | adapter ring |
| 32 | bearing |
| 33 | spoke flange |
| 34 | threaded ring |
| 35 | sealing device |
| 36 | spacer sleeve |
| 37 | spacer sleeve |
| 38 | bearing |
| 39 | shoulder |
| 40 | shoulder |
| 41 | seal |
| 42 | seal |
| 43 | external toothing |
| S | south pole |
| N | north pole |

The invention claimed is:

1. A hub for at least partially muscle-powered vehicles and in particular two-wheeled vehicles, comprising: a hub axle; a hub body; a rotatable driving device; and having a freewheel device;
   the freewheel device comprises a first and a second engagement component cooperating with one another having at least one axial toothing each;
   the freewheel device is biased to an engaging position via a magnetic biasing device, said magnetic biasing device including a first magnetic device biases the first engagement component and a second magnetic device biases the second engagement component to the engaging position, wherein the first magnetic device and the second magnetic device each comprise a pair of mutually repelling magnetic components; and
   at least one of the magnetic components comprises at least one carrier unit and a multitude of magnetic units disposed thereat, wherein the number of magnetic units on said at least one carrier unit is variable.

2. The hub according to claim 1 wherein at least one of the magnetic components comprises a magnetic ring.

3. The hub according to claim 1 wherein the carrier unit is disposed axially adjacent to the axial toothing.

4. The hub according to claim 1 wherein the carrier unit consists of a lightweight material such as a light metal or a lightweight plastic or a natural material.

5. The hub according to claim 1 wherein substantially all of the magnetic units of a magnetic component show the same pole orientation.

6. The hub according to claim 1 wherein at least one engagement component comprises a toothed disk at which a magnetic component is disposed.

7. The hub according to claim 6 wherein the toothed disk has a circumferential and substantially L-shaped cross section.

8. The hub according to claim 1 wherein two toothed disks are provided as engagement components and both are received floating.

9. The hub according to claim 8 wherein one toothed disk of the two toothed disks is disposed non-rotatably and axially movably in the hub body and the other toothed disk is disposed non-rotatably and axially movably at the driving device.

10. The hub according to claim 1 wherein at least one toothed disk is received in a retaining ring which is non-rotatably disposed at the hub body.

11. The hub according to claim 1 wherein at least one magnetic unit is at least partially disposed in an accommodation of the toothed disk.

12. The hub according to claim 1 wherein at least one spacer sleeve is provided.

13. The hub according to claim 1 wherein at least one engagement component is configured as a magnetic device.

* * * * *